United States Patent
Zhou et al.

(10) Patent No.: US 12,451,990 B2
(45) Date of Patent: Oct. 21, 2025

(54) SYSTEM AND METHOD FOR DECODING DATA

(71) Applicant: THE ROYAL INSTITUTION FOR THE ADVANCEMENT OF LEARNING / MCGILL UNIVERSITY, Montréal (CA)

(72) Inventors: Huayi Zhou, Montreal (CA); Warren J. Gross, Cote-St-Luc (CA)

(73) Assignee: THE ROYAL INSTITUTION FOR THE ADVANCEMENT OF LEARNING / MCGILL UNIVERSITY, Montreal (CA)

( * ) Notice: Subject to any disclaimer, the term of this patent is extended or adjusted under 35 U.S.C. 154(b) by 0 days.

(21) Appl. No.: 18/390,209

(22) Filed: Dec. 20, 2023

(65) Prior Publication Data

US 2025/0211364 A1     Jun. 26, 2025

Related U.S. Application Data

(60) Provisional application No. 63/434,952, filed on Dec. 23, 2022.

(51) Int. Cl.
*H04L 1/00*     (2006.01)
(52) U.S. Cl.
CPC ................. *H04L 1/0054* (2013.01)
(58) Field of Classification Search
CPC ... H04L 1/0054; H04L 1/0041; H04L 1/0045; H04L 1/0643
See application file for complete search history.

(56) References Cited

U.S. PATENT DOCUMENTS

| | | | |
|---|---|---|---|
| 10,902,216 B2 * | 1/2021 | Lee | G06F 40/58 |
| 10,970,508 B2 * | 4/2021 | Negro | G06K 19/06037 |
| 11,259,014 B2 * | 2/2022 | Furht | H04N 19/124 |
| 2002/0122221 A1 * | 9/2002 | Kubo | H03M 13/1515 |
| | | | 398/9 |

(Continued)

OTHER PUBLICATIONS

Zhu et al., On performance of sphere decoding and Markov chain Monte Carlo detection methods, IEEE, Signal Processing Letters, vol. 12, No. 10, pp. 669 to 672. (Year: 2005).*

(Continued)

*Primary Examiner* — Shelly A Chase
(74) *Attorney, Agent, or Firm* — NORTON ROSE FULBRIGHT CANADA LLP

(57) ABSTRACT

A method for decoding data comprises receiving a sequence of symbols from a data sender over a noisy data channel. At a first decoder, a first search for a candidate error pattern is performed, within a search region, among a plurality of candidate error patterns, and an indication of a failure of the first search is output to a second decoder when no candidate error pattern is found within the search region. At the second decoder, a second search is performed, in parallel with the first search, for the candidate error pattern by evaluating the candidate error patterns for codebook membership based on the sequence of symbols, one or more of the candidate error patterns being skipped from the second search based on the indication of the failure of the first search. The sequence of symbols is decoded based on an outcome of the first search and the second search.

20 Claims, 9 Drawing Sheets

(56) References Cited

U.S. PATENT DOCUMENTS

| | | | | |
|---|---|---|---|---|
| 2006/0273457 | A1* | 12/2006 | Sel | H10B 69/00 257/734 |
| 2008/0270961 | A1* | 10/2008 | Mead | H03M 13/1515 716/113 |
| 2011/0202815 | A1* | 8/2011 | Toda | H03M 13/152 714/783 |
| 2015/0003262 | A1* | 1/2015 | Eder | H04B 7/0413 370/252 |
| 2020/0106460 | A1* | 4/2020 | Ku | H03M 13/152 |
| 2021/0384918 | A1* | 12/2021 | Solomon | H03M 13/3746 |

OTHER PUBLICATIONS

Duffy et al., "Guessing noise, not code-words", 2018 IEEE International Symposium on Information Theory, DOI: 10.1109/ISIT.2018.8437648.

Duffy et al., "Capacity-Achieving Guessing Random Additive Noise Decoding", IEEE Transactions on Information Theory, 2019, DOI: 10.1109/TIT.2019.2896110.

Duffy et al., "Guessing random additive noise decoding with soft detection symbol reliability information—SGRAND", 2019 IEEE International Symposium on Information Theory, DOI: 10.1109/ISIT.2019.8849297.

Dufy et al., "Guessing Random Additive Noise Decoding With Symbol Reliability Information (SRGRAND)", IEEE Transactions on Communications (2022), DOI: 10.1109/TCOMM.2021.3114315.

Valembois et al., "An Improved Method to Compute Lists of Binary Vectors That Optimize a Given Weight Function With Application to Soft-Decision Decoding", IEEE Communications Letters, 2001, DOI: 10.1109/4234.966032.

Solomon et al., "Soft Maximum Likelihood Decoding using GRAND", IEEE International Conference on Communications (ICC), 2020, DOI: 10.1109/ICC40277.2020.9149208.

Duffy et al., "Ordered Reliability Bits Guessing Random Additive Noise Decoding", IEEE Transactions on Signal Processing, 2022, DOI: 10.1109/TSP.2022.3203251.

Abbas et al., "Hardware Architecture for Guessing Random Additive Noise Decoding Markov Order (GRAND-MO)", Journal of Signal Processing Systems, 2022, DOI: 10.1007/s11265-022-01775-2.

Abbas et al., "GRAND for Rayleigh Fading Channels", IEEE Globecom Workshops (2022), DOI: 10.1109/GCWkshps56602.2022.10008698.

Sarieddeen et al., "GRAND for Fading Channels using Pseudo-soft Information", IEEE Global Communications Conference, 2022, DOI: 10.1109/GLOBECOM48099.2022.10001707.

Abbas et al., "High-Throughput VLSI Architecture for GRAND", IEEE Workshop on Signal Processing Systems (SiPS), 2020, DOI: 10.1109/SiPS50750.2020.9195254.

Abbas et al., "High-Throughput and Energy-Efficient VLSI Architecture for Ordered Reliability Bits GRAND", IEEE Transactions on Very Large Scale Integration (VLSI) Systems, 2022, DOI: 10.1109/TVLSI.2022.3153605.

Abbas et al., "List-GRAND: A Practical Way to Achieve Maximum Likelihood Decoding", EEE Transactions on Very Large Scale Integration (VLSI) Systems, 2023, DOI: 10.1109/TVLSI.2022.3223692.

Riaz et al., "A Universal Maximum Likelihood GRAND Decoder in 40nm CMOS", 14th International Conference on Communication Systems & NETworks, 2022, DOI: 10.1109/COMSNETS53615.2022.9668514.

Condo, Carlo, "A Fixed Latency ORBGRAND Decoder Architecture With LUT-Aided Error-Pattern Scheduling", IEEE Transactions on Circuits and Systems I: Regular Papers, 2022, DOI: 10.1109/TCSI.2022.3150583.

Kahraman et al., "Code based efficient maximum-likelihood decoding of short polar codes", IEEE International Symposium on Information Theory Proceedings, 2012, DOI: 10.1109/ISIT.2012.6283643.

Guo et al., "Efficient sphere decoding of polar codes", IEEE International Symposium on Information Theory (ISIT), 2015, DOI: 10.1109/ISIT.2015.7282452.

Husmann et al., "Reduced Latency ML Polar Decoding via Multiple Sphere-Decoding Tree Searches", IEEE Transactions on Vehicular Technology, 2018, DOI: 10.1109/TVT.2017.2761262.

Zhou et al., "Efficient Sphere Polar Decoding via Synchronous Determination", IEEE Transactions on Vehicular Technology, 2020, DOI: 10.1109/TVT.2020.2986915.

Trifonov, Peter, "Efficient Design and Decoding of Polar Codes", IEEE Transactions on Communications, 2012, DOI: 10.1109/TCOMM.2012.081512.110872.

Li et al., "A RM-Polar Codes." ArXiv abs/1407.5483 (2014).

* cited by examiner

SYSTEM AND METHOD FOR DECODING DATA

CROSS-REFERENCE TO RELATED APPLICATIONS

The present application claims priority on U.S. Patent Application No. 63/434,952 filed Dec. 23, 2022, the entire contents of which are incorporated herein by reference.

FIELD

The improvements generally relate to the field of decoding data, and more particularly to decoding data using noise guessing.

BACKGROUND

Guessing Random Additive Noise Decoding (GRAND) is as a Maximum Likelihood (ML) decoding technique for forward error-correcting block codes. Using GRAND, a block code can be decoded based on guessing noise. In particular, added noise is guessed by flipping bit locations of a received noisy codeword and codebook membership of the received codeword can then be checked to correct the noise effect. However, despite the complexity reduction offered by existing GRAND techniques, the computational complexity of GRAND remains a function of N-K, where N is the code length and K is the number of information bits. This is turn limits GRAND to high-rate codes. There is therefore room for improvement.

SUMMARY

In accordance with one aspect, there is provided a method for decoding data. The method comprises, at a data receiver comprising at least one first decoder and at least one second decoder configured to run in parallel with the first decoder, receiving a sequence of symbols from a data sender over a noisy data channel at the at least one first decoder, performing, within a search region, a first search for a candidate error pattern among a plurality of candidate error patterns, and outputting, to the at least one second decoder, an indication of a failure of the first search when no candidate error pattern is found within the search region; at the at least one second decoder, performing, in parallel with the first search, a second search for the candidate error pattern by evaluating the plurality of candidate error patterns for codebook membership based on the sequence of symbols, one or more of the plurality of candidate error patterns being skipped from the second search based on the indication of the failure of the first search; and decoding the sequence of symbols based on an outcome of the first search and the second search.

In at least one embodiment in accordance with any previous/other embodiment described herein, the at least one first decoder implements a Sphere Decoding (SD) technique and the at least one second decoder implements a Guessing Random Additive Noise Decoding (GRAND) technique.

In at least one embodiment in accordance with any previous/other embodiment described herein, the at least one first decoder implements one of multiple tree search SD (MSD), SD with fixed lower bound, list SD, stack SD, and cyclic redundancy check (CRC)-aided SD.

In at least one embodiment in accordance with any previous/other embodiment described herein, the at least one first decoder implements an efficient multiple tree search SD (EMSD) decoding technique.

In at least one embodiment in accordance with any previous/other embodiment described herein, the at least one second decoder implements one of soft GRAND (SGRAND), ordered reliability bits GRAND (ORBGRAND), ORBGRAND, GRAND with abandonment (GRANDAB), GRAND with symbol reliability information (SRGGRAND), GRAND Markov Order (GRAND-Mo), and List-GRAND.

In at least one embodiment in accordance with any previous/other embodiment described herein, the search region is defined by a radius, and performing the first search for the candidate error pattern comprises progressively expanding the radius of the search region until the candidate error pattern is found within the search region.

In at least one embodiment in accordance with any previous/other embodiment described herein, receiving the sequence of symbols comprises receiving a code having a triangular generator matrix.

In at least one embodiment in accordance with any previous/other embodiment described herein, receiving the sequence of symbols comprises receiving one of a polar code and a Read-Muller (RM) code.

In at least one embodiment in accordance with any previous/other embodiment described herein, receiving the sequence of symbols comprises receiving a Bose-Chaudhuri-Hocquenghem (BCH) code.

In accordance with another aspect, there is provided a data receiver comprising a receiving unit configured for receiving a sequence of symbols from a data sender over a noisy data channel; a decoding unit comprising at least one first decoder and at least one second decoder configured to run in parallel with the first decoder, the at least one first decoder configured for performing, within a search region, a first search for a candidate error pattern among a plurality of candidate error patterns, and outputting, to at least one second decoder, an indication of a failure of the first search when no candidate error pattern is found within the search region; and the at least one second decoder configured for performing, in parallel with the first search, a second search for the candidate error pattern by evaluating the plurality of candidate error patterns for codebook membership based on the sequence of symbols, one or more of the plurality of candidate error patterns being skipped from the second search based on the indication of the failure of the first search; and the decoding unit configured for decoding the sequence of symbols based on an outcome of the first search and the second search.

In at least one embodiment in accordance with any previous/other embodiment described herein, the at least one first decoder implements a Sphere Decoding (SD) technique and the at least one second decoder implements a Guessing Random Additive Noise Decoding (GRAND) technique.

In at least one embodiment in accordance with any previous/other embodiment described herein, the at least one first decoder implements one of multiple tree search SD (MSD), SD with fixed lower bound, list SD, stack SD, and cyclic redundancy check (CRC)-aided SD.

In at least one embodiment in accordance with any previous/other embodiment described herein, the at least one first decoder implements an efficient multiple tree search SD (EMSD) decoding technique.

In at least one embodiment in accordance with any previous/other embodiment described herein, the at least one second decoder implements one of soft GRAND (SGRAND), ordered reliability bits GRAND (ORBGRAND), ORBGRAND, GRAND with abandonment (GRANDAB), GRAND with symbol reliability information (SRGGRAND), GRAND Markov Order (GRAND-Mo), and List-GRAND.

In at least one embodiment in accordance with any previous/other embodiment described herein, the search region is defined by a radius, and the at least one first decoder is configured for performing the first search for the candidate error pattern comprising progressively expanding the radius of the search region until the candidate error pattern is found within the search region.

In at least one embodiment in accordance with any previous/other embodiment described herein, the receiving unit is configured for receiving the sequence of symbols comprising receiving a code having a triangular generator matrix.

In at least one embodiment in accordance with any previous/other embodiment described herein, the receiving unit is configured for receiving the sequence of symbols comprising receiving one of a polar code and a Read-Muller (RM) code.

In at least one embodiment in accordance with any previous/other embodiment described herein, the receiving unit is configured for receiving the sequence of symbols comprising receiving a Bose-Chaudhuri-Hocquenghem (BCH) code.

In at least one embodiment in accordance with any previous/other embodiment described herein, the data receiver further comprises an output unit configured for receiving a decoded sequence of symbols from the decoding unit and for transmitting the decoded sequence of symbols to an external device.

In accordance with another aspect, there is provided a non-transitory computer readable medium having stored thereon program code executable by at least one processor for receiving a sequence of symbols over a noisy data channel, performing, within a search region, a first search for a candidate error pattern among a plurality of candidate error patterns, outputting an indication of a failure of the first search when no candidate error pattern is found within the search region, performing, in parallel with the first search, a second search for the candidate error pattern by evaluating the plurality of candidate error patterns for codebook membership based on the sequence of symbols, one or more of the plurality of candidate error patterns being skipped from the second search based on the indication of the failure of the first search, and decoding the sequence of symbols based on an outcome of the first search and the second search.

Many further features and combinations thereof concerning embodiments described herein will appear to those skilled in the art following a reading of the instant disclosure.

DESCRIPTION OF THE FIGURES

In the figures.

DETAILED DESCRIPTION

Described herein are systems and methods for decoding data. The systems and methods described herein apply to a context in which a data sender sends data (i.e. a sequence of symbols referred to herein as a "block", "code", or "block code") toward a data receiver using a communication medium referred to herein as a "data channel". The data sender and the data receiver operate using a shared set of blocks, or a description of such a set of blocks, referred to as a "codebook" which consists of a number of codewords (i.e. a "codeword" refers to a block in the codebook). The input to the data channel or "channel input" (i.e. the block sent by the data sender into the data channel) may however differ from the corresponding output of the data channel or "channel output" (i.e. a corresponding block received by the data receiver from the data channel) due to an error (also referred to herein as "noise") caused by transient passage of the block through the data channel (referred to herein as a "noisy" data channel). In order for the data receiver to correct the noise that alters the channel input, it is proposed herein to decode block codes using the combination of at least one first decoder (also referred to herein as a "decoding unit") and at least one second decoder running in parallel with the first decoder, as illustrated in FIG. 1A and FIG. 1B.

Figure 1A:
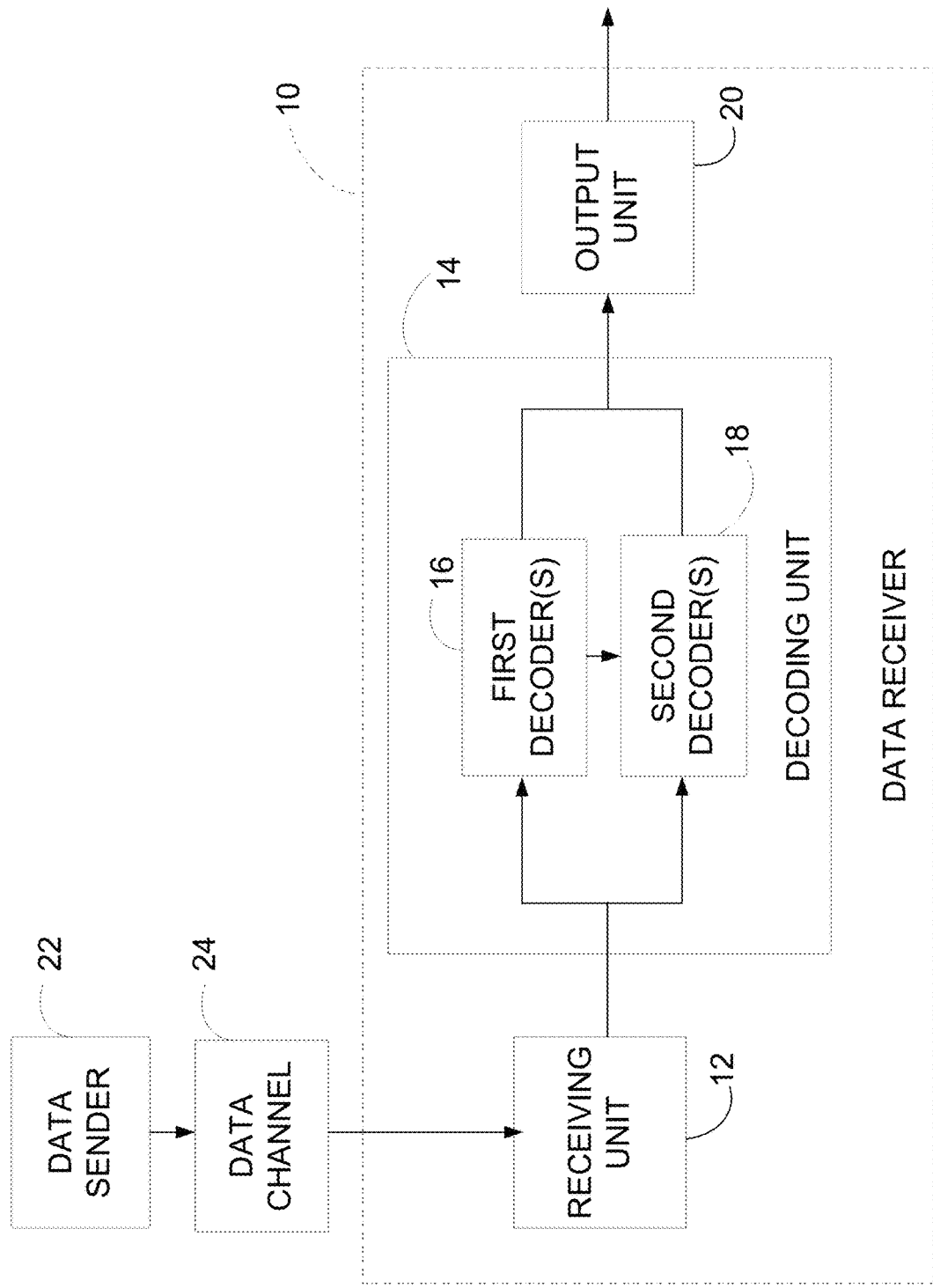
FIG. 1A is a block diagram of a data receiver, in accordance with one embodiment.
Figure 1B:
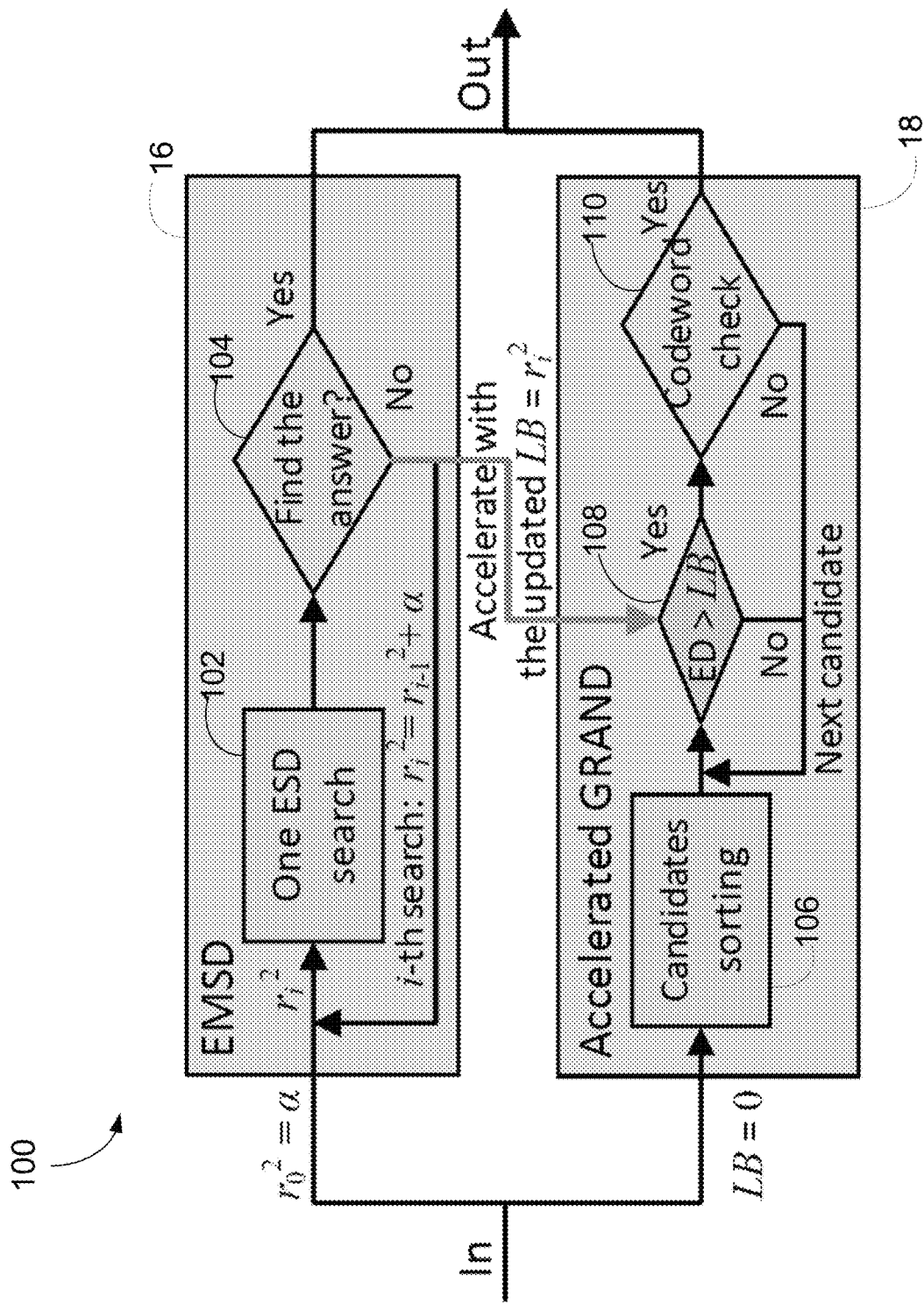
FIG. 1B is a schematic diagram of the decoding process performed by the decoding unit of FIG. 1A, in accordance with one embodiment.

Referring to FIG. 1A, a data receiver 10 used for decoding data will now be described, in accordance with one embodiment. The data receiver 10 may be implemented using a combination of hardware and software components. In one embodiment, the data receiver 10 comprises a receiving unit 12, which may comprise any suitable component(s) including, but not limited to, a network interface card or controller (NIC). The data receiver 10 further comprises a decoding unit 14 coupled to the receiving unit 12, the decoding unit 14 comprising at least one first decoder 16 and at least one second decoder 18. The data receiver 10 also comprises an output unit 20 coupled to the decoding unit 14. In operation, the receiving unit 12 receives a sequence of symbols (i.e. information bits) from a data sender 22 over a noisy data channel 24. The decoding unit 14 then decodes the sequence of symbols received from the receiving unit 12 and generates decoded block codes which are sent to the output unit 20 for transmission (e.g., to an external device).

The data sender 22 may be any device capable of transmitting data (e.g., data packets) to another device, using the data channel 24, and the data receiver 10 may be any device capable of receiving data (e.g., data packets) from another device, using the data channel 24. The data channel 24 may be any suitable communication medium (or plurality of coupled media) capable of communicating data packets between data sender(s) and data receiver(s). The data channel 24 includes, but is not limited to, an analog channel, a digital channel, and any combination thereof.

Throughout the instant disclosure, codes with triangular generator matrices are considered, although it should be understood that other suitable codes may apply. Let a code be noted as (N, K). The code rate is R=K/N. As used herein, the term "rate" or "code rate" refers to the ratio between the number (K) of information bits and the total number (N) of bits or code length (i.e., the number of information bits plus the number of redundancy bits which carry no information) in a given block code. Thus, a "low-rate code" refers to a code with high redundancy (i.e. that uses many redundancy bits), while a "high-rate code" refers to a code with low redundancy (i.e. that uses few redundancy bits).

Let the information vector and the encoded vector be denoted as $u_1^N = (u_1, u_2, \ldots, u_N)$ and $x_1^N$, respectively. Let $G_N$ be the generator matrix of size N, we have $x_1^N = u_1^N G_N = u_1^N F^{\otimes n}$. $F^{\otimes n}$ is calculated by the n-th Kronecker product of $$\begin{bmatrix} 1 & 0 \\ 1 & 1 \end{bmatrix}.$$

Let the (i, j)-th entry of $G_N$ be denoted as $g_{(i,j)}$.

Throughout the instant disclosure, binary phase-shift keying (BPSK) modulation and the additive white Gaussian noise (AWGN) channel are considered. The mapped bits $v_1^N$ are calculated as $v_1^N = 1 - 2x_1^N$, where $x_1^N \in \{1, -1\}^N$. Let the received vector be denoted as $y_1^N = (y_1, y_2, \ldots, y_N) = v_1^N + w_1^N$, where $w_1^N$ is the AWGN vector with mean 0 and variance $\sigma^2$.

The received noisy version of the modulated codeword is $\bar{y} = (1 - y_1^N)/2$, where 1 is the all-one vector of length N. Let U denote as the set of all $u_1^N$. A decoding technique referred to as Sphere Decoding (SD) may be used to enumerate all possible paths $u_1^N$ to solve $$\hat{u}_1^N = \underset{u_1^N \in u}{\operatorname{argmin}} \|\bar{y} - u_1^N G_N\|^2.$$

In order to obtain the maximum likelihood (ML) estimate of the transmitted signal (i.e. of the channel input), an SD decoder considers only the candidate error patterns (also referred to herein as "candidates") that reside within a N-dimensional sphere of a given radius and center.

Let the Euclidean distance (ED) of bit i be denoted as $D_i \triangleq (\bar{y} - \oplus_{j=1}^N (g_{(j,i)} u_j))^2$ where $\oplus_{j=a}^b (\cdot)$ is the summation over GF(2). From level N to level 1, SD depth-first searches the path with the minimum ED satisfying $$\sum_{i=1}^N D_i \leq r_0^2,$$

where $r_0$ is the radius. To reduce the large search space, SD, and particularly (Efficient multiple tree search SD (or EMSD), starts the first search with a small radius $r_0$ and sets $r_0^2 = a$. The following i-th search will start with the updated radius $r_i^2 = r_{i-1}^2 + a$ until the output is found. To further reduce the complexity on low-rate codes, EMSD uses synchro sets to improve the metric evaluation. SD is thus efficient on low-rate codes (particularly polar codes) since the searching space is at most $O(2^K)$. As the rate grows, the decoding complexity of current SD techniques could be further reduced.

Unlike the enumeration on $u_1^N$ of SD, decoders using techniques such as Guessing Random Additive Noise Decoding (GRAND) guess noise to obtain the correct $x_1^N$.

In one embodiment, based on $\bar{y}$, GRAND generates several possible candidates of $x_1^N$, and sorts them as $C_1, C_2, \ldots$, where each $C_j$ is a candidate version of $x_1^N$. $C_1$ is the most likely candidate with the minimum metric, $C_2$ is the second most likely candidate, and so on. The candidates $C_1, C_2, \ldots$ are checked one by one until the first valid codeword is found. Soft GRAND (or SGRAND) may be implemented, where ED is used as the metric to define the reliability and could achieve the ML bound. In order to be more hardware-friendly, ordered reliability bits GRAND (ORBGRAND) may be implemented, where logistic weights are used to sort the candidates, at a performance loss compared to SGRAND. Existing GRAND techniques may however only prove efficient on high-rate codes. Since there are few information bits on low-rate codes, most guessed candidates are invalid using known techniques and existing GRAND techniques waste much time complexity on the codeword check.

To overcome these issues, it is proposed herein to combine at least one first decoder implementing a first decoding technique (e.g., SD) with at least one second decoder implementing a second decoding technique (e.g., GRAND) to develop an efficient decoder for both low-rate and high-rate codes, as illustrated in FIG. 1A and FIG. 1B. As will be described further herein, the at least one first decoder provides information about its search to help the at least one second decoder avoid unnecessary computations by skipping certain candidate error patterns from its search.

FIG. 1B illustrates the decoding process 100 implemented by the decoding unit 14, in accordance with one embodiment. In the illustrated embodiment, one or more first decoders 16 implement an SD decoding technique, and more particularly multiple tree search SD (or MSD) decoding such as EMSD, as shown in the upper part of FIG. 1B, and one or more second decoders 18 implement a GRAND decoding technique. The decoding technique described herein may thus be referred to as a hybrid-GRAND (or HGRAND) technique, and the decoding unit 14 may be referred to as a HGRAND decoder. It should however be understood that any suitable decoding technique may apply. For instance, any suitable SD technique including, but not limited to, SD with fixed lower bound, MSD, list SD, stack SD, and cyclic redundancy check (CRC)-aided SD, may be implemented by the first decoder(s) 16. In addition, although reference is made herein to the first decoder 16 being an SD decoder, it should be understood that any other suitable decoder configured to perform a radius search and advise the second decoder 18 of a failure when no codeword is found within a certain radius may apply. For example, brute-force methods with different pruning techniques may apply. Furthermore, any suitable GRAND technique including, but not limited to, SGRAND, ORBGRAND, GRAND with abandonment (GRANDAB), GRAND with symbol reliability information (SRGGRAND), Fading GRAND, GRAND Markov Order (GRAND-Mo), and List-GRAND, may be implemented by the second decoder(s) 18. In addition, although reference is made herein to a single first decoder 16 and a single second decoder 18, it should be understood that the decoding unit 14 may comprise multiple first decoders as in 16 and multiple second decoders as in 18, the multiple decoders running in parallel.

The systems and methods described herein may allow to extend GRAND to low-rate codes. The systems and methods described herein may indeed be used for near-ML decoding of short polar and Read-Muller (RM) codes, and more generally to any short code with a triangular generator matrix. It should however be understood that the systems and methods described herein may be applicable to other types of codes that do not have a triangular generator matrix. For example, linear block codes including, but not limited to, Bose-Chaudhuri-Hocquenghem (BCH) codes, CRC codes, and low-density parity-check (LDPC) codes may apply.

In one embodiment, the first decoder 16 and the second decoder 18 operate concurrently, at substantially the same time. As shown in FIG. 1B, the first decoder 16 searches (at 102) for the correct path in a sphere with an initial radius $r_0$ (and sets $r_0^2=a$), where one search in EMSD is referred to as an efficient SD (or ESD) search. The first decoder 16 then assesses (at 104) whether an answer is found as a result of the search. If an answer is found, it is output by the first decoder 16. If no answer is found, then the first decoder 16 increases the radius (i.e. sets $r_i^2=r_{i-1}^2+a$) for the next search. In parallel with the first decoder 16, the second decoder 18 generates and sorts candidates (at 106) and checks the candidates from the most likely to the least likely. If the i-th search of the first decoder 16 could not find the answer in the sphere with the radius $r_i$, then this message is provided to the second decoder 18, which can skip the candidates in the same sphere.

The failure of the current (e.g., ESD) search performed by the first decoder 16 thus updates a lower bound LB=$r_i^2$ for the second decoder 18, which can accelerate its operation (thus implementing a decoding technique referred to herein as "accelerated GRAND") because the correct candidate should have a larger ED than the lower bound LB. In other words, upon detecting failure of the current search of the first decoder 16, the second decoder 18 is able to skip some candidate error patterns from its search.

Compared with traditional GRAND, accelerated GRAND as implemented by the second decoder 18 is used to compare the ED of the current candidate (calculated as $$\sum_{i=1}^{N} (\bar{y}_i - x_i)^2$$

with the lower bound LB (at 108). If the ED is smaller, this candidate must not be the answer and could be skipped without the codeword check, which could save time. In other words, the second decoder 18 moves on to the next candidate and repeats the comparison of the ED to the lower bound LB for the next candidate. The LB is updated when an ESD search failure occurs. When a candidate with a larger ED than the lower bound LB is found, the second decoder 18 assesses (at 110) whether to proceed with the codeword check and subsequently outputs the result of the codeword check when performed. If no codeword check is to be performed, the second decoder 18 proceeds with the next candidate and repeats the comparison of the ED to the lower bound LB for the next candidate.

Figure 2A:
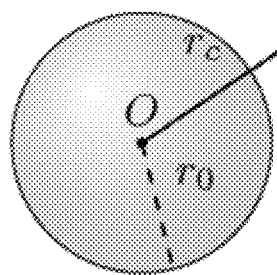
FIG. 2A is a schematic diagram of a possible outcome of the decoding process performed by the decoding unit of FIG. 1A, in accordance with one embodiment.
Figure 2A:
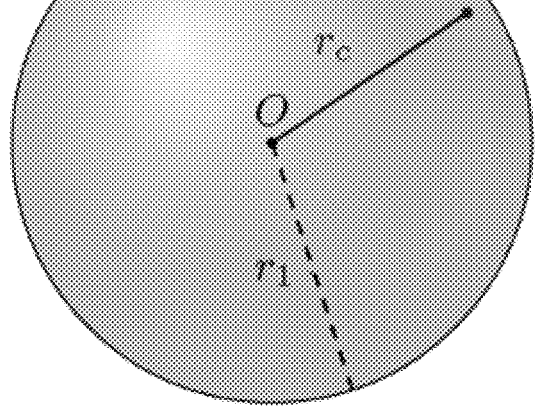
Figure 2A:
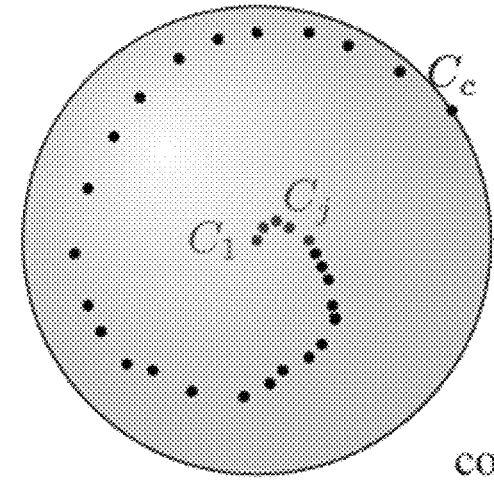
Figure 2B:
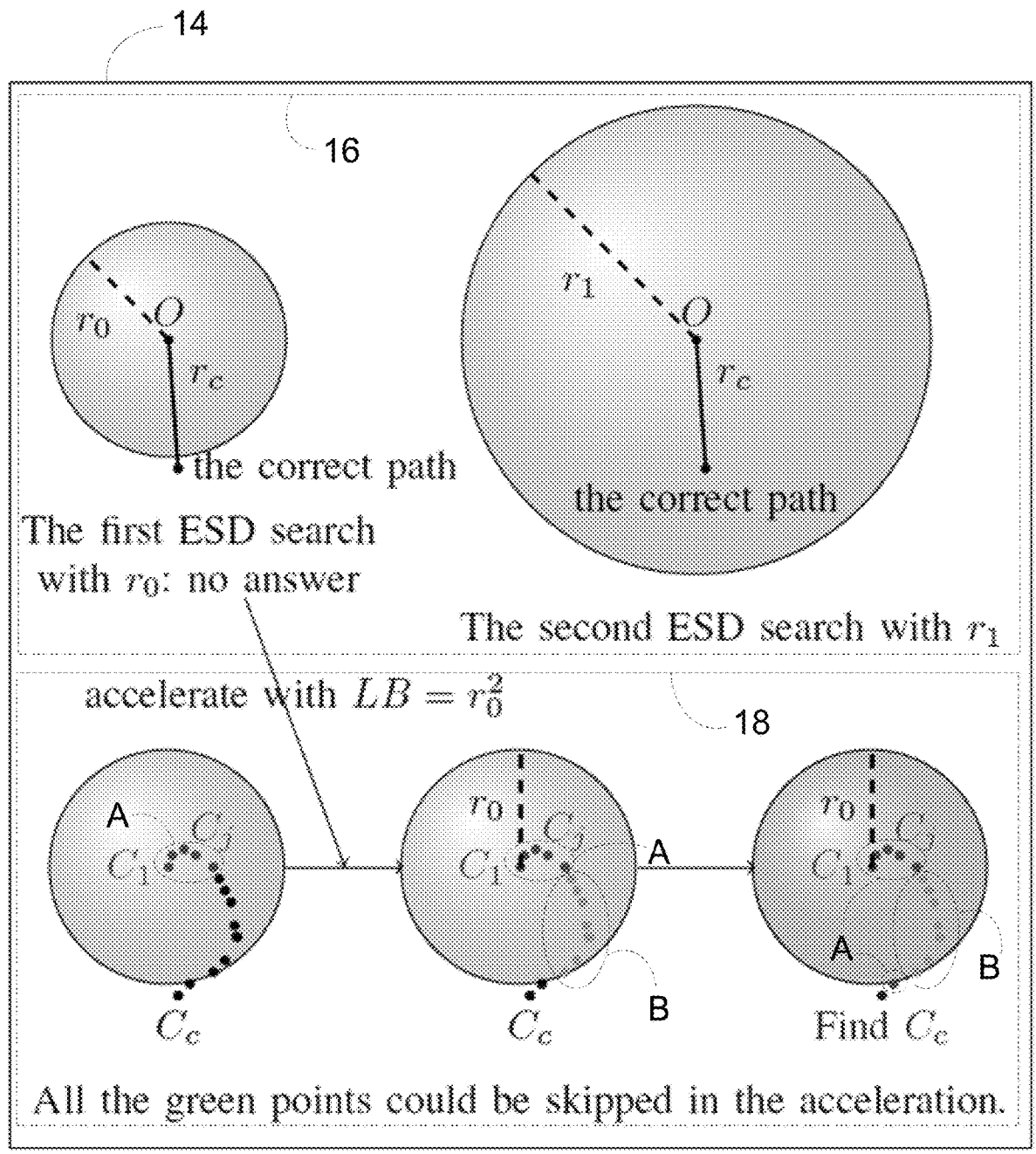
FIG. 2B is a schematic diagram of a possible outcome of the decoding process performed by the decoding unit of FIG. 1A, in accordance with another embodiment.

At the output of the decoding unit 14, there may be three cases. In the first case (illustrated in FIG. 2A), the first decoder 16 (e.g., implementing EMSD) finds the correct path faster than the second decoder 18 (e.g., implementing GRAND). The correct candidate may be assumed to be Cc. As shown in FIG. 2A, if most guessed candidates are invalid, the second decoder 18 may take a long time to find Cc. Meanwhile, the first decoder 16 starts the first search with $r_0$ and finds no answer. The first decoder 16 then increases the radius and finds the correct path in the following searches. This first case stands a good chance when the rate is not very high. In the second case (which usually happens for very-high rate codes), the second decoder 18 finds the correct path faster than the first decoder 16. If the correct candidate has a small metric, such as Cc=$C_1$ or Cc=$C_2$, then the second decoder 18 will find it faster than the first decoder 16 since the second decoder 18 enumerates candidates from the most likely to the least likely. In the third case (illustrated in FIG. 2B), the second decoder 18 finds the correct path first. As shown in FIG. 2B, a failed ESD search with $r_i$ (i=0 in FIG. 2B) occurs at the first decoder 16 and the LB is updated as LB=$r_i^2$. It is assumed that several candidates have been checked in the same period (denoted by the points labelled "A" in FIG. 2B). The following candidates with a smaller ED than LB (denoted by the points labelled "B" in FIG. 2B) can be directly skipped without a codeword check and therefore the second decoder 18 has a chance of finding the correct candidate faster than the first decoder 16.

The decoding process implemented by the decoding unit 14 terminates at the earliest of the above three cases and delivers the output to the output unit 20. If only the first and second cases are considered, then the latency of the decoding process implemented by the decoding unit 14 will be at most the minimum latency of the first decoder 16 (e.g., the latency of EMSD) and the latency of the second decoder 18 (e.g., the latency of GRAND). However, the third case shows that the systems and methods described herein may even be faster than the minimum latency of EMSD and GRAND. In other words, in some embodiments, the decoding technique described herein may exhibit a minimum time complexity lower than the individual minimal complexities of EMSD and GRAND.

As previously noted, any suitable GRAND technique may be used herein. If the second decoder 18 applies SGRAND, the error-correction performance of the decoding unit 14 will be ML. If the second decoder 18 applies ORBGRAND, the error-correction performance of the decoding unit 14 will be near-ML.

Figure 3:
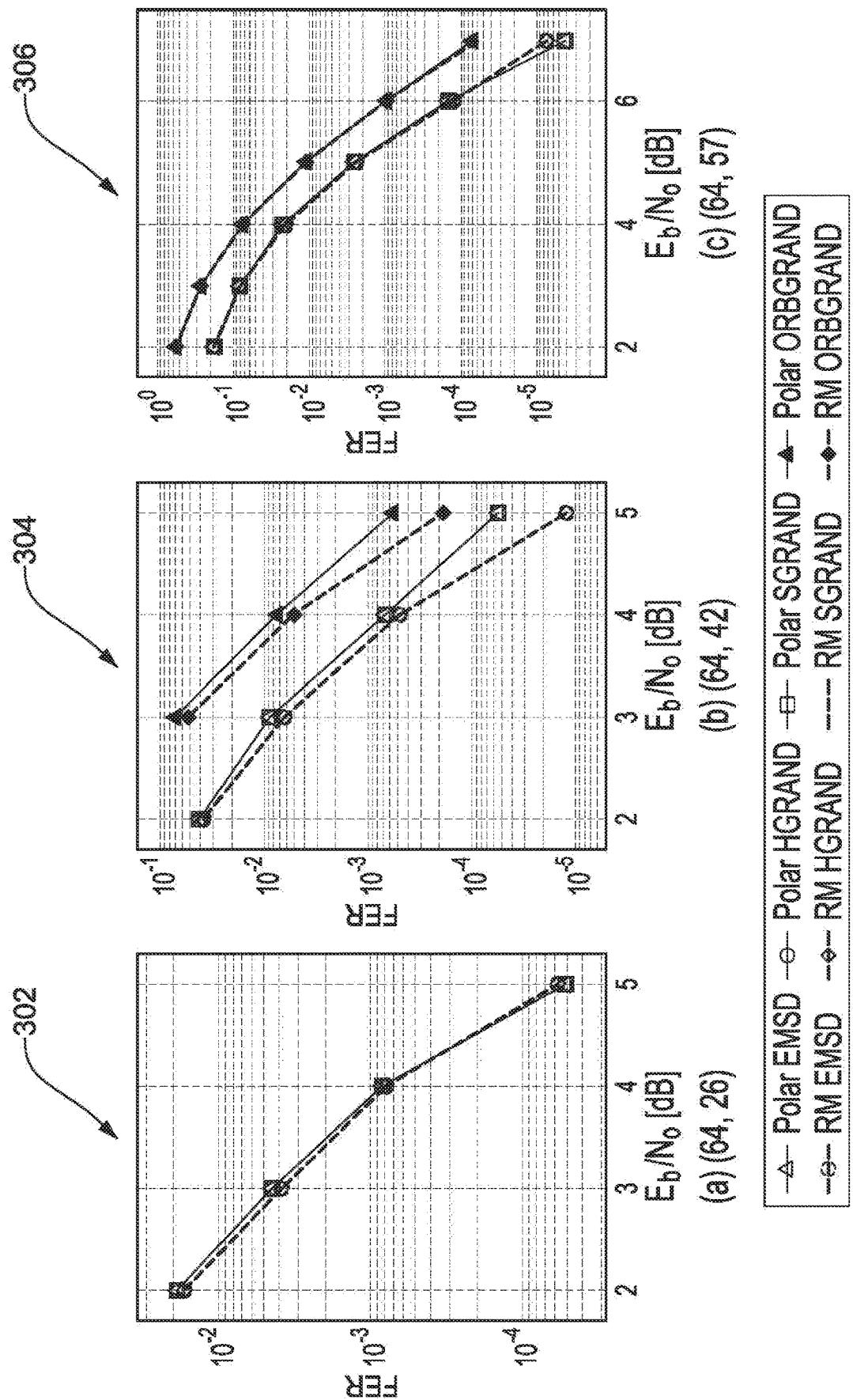
FIG. 3 illustrates plots of the frame error rate (FER) comparison on different rates, for polar codes and RM codes, in accordance with one embodiment.

FIG. 3 illustrates the frame error rate (FER) comparison on different rates, for polar codes and RM codes. It can be seen that HGRAND, EMSD, and SGRAND share the same ML performance on the same codes. As seen from plot 302, for a low-rate code (64, 26), SGRAND and ORBGRAND cost too much complexity to output the results. As seen from plots 304 and 306, for (64, 42) and (64, 57) codes, ORBGRAND has a FER performance loss compared to other schemes. Using (64, 42) RM codes, HGRAND obtains an up to 0.5 dB gain compared to polar codes.

Figure 4:
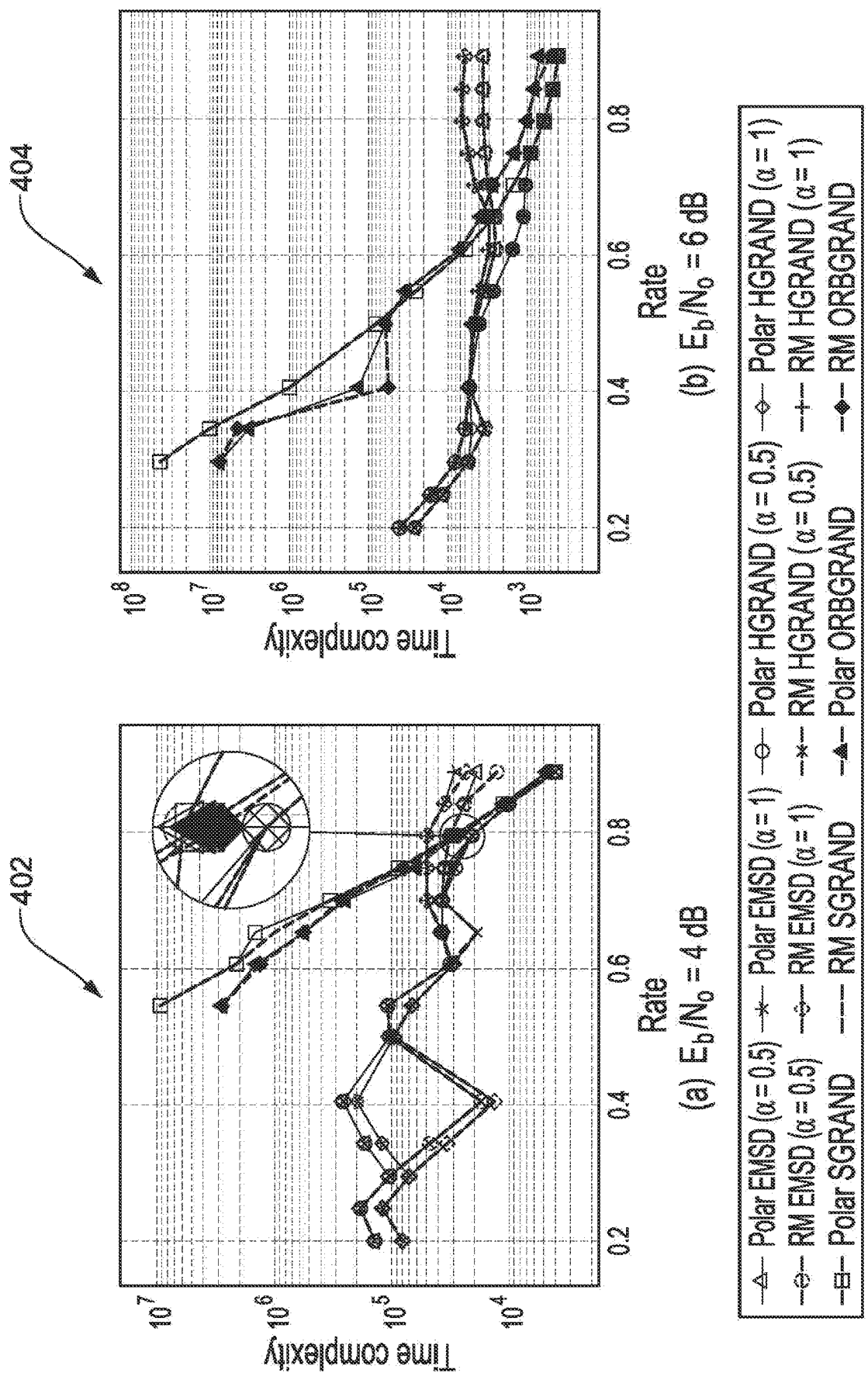
FIG. 4 illustrates plots of the time complexity comparison at different values of the energy per bit to noise power spectral density ratio ($Eb/N_0$), in accordance with one embodiment.
Figure 4:
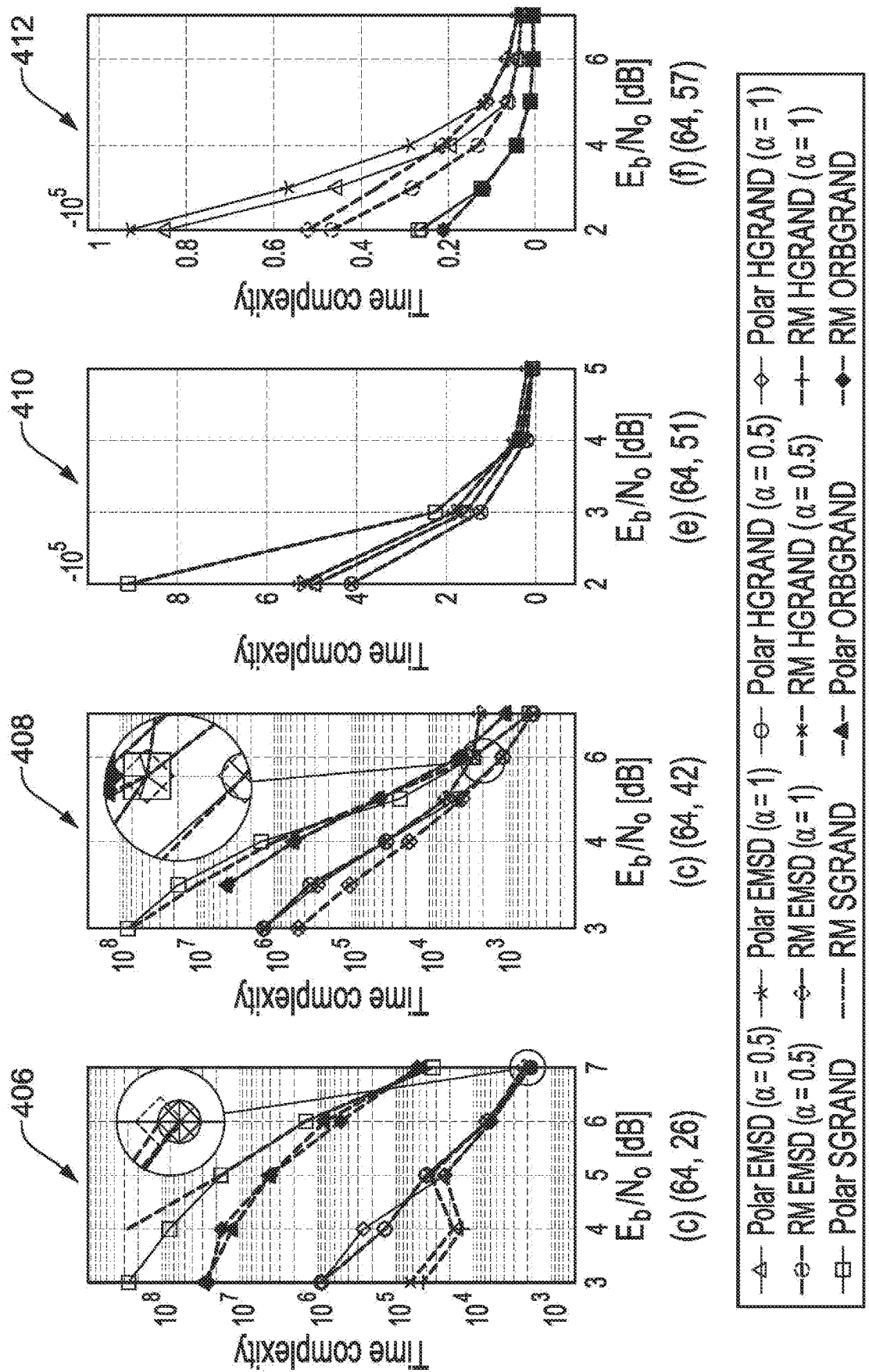

FIG. 4 illustrates the time complexity comparison of the schemes at $E_b/N_0$=4 dB and 6 dB, where $E_b/N_0$ is the energy per bit to noise power spectral density ratio. It can be seen that the time complexity of HGRAND is more than 100 times less than SGRAND and ORBGRAND at low rates. At $E_b/N_0$=4 dB (see plot 402), the complexity of SGRAND and ORBGRAND are extremely high when R≤0.75, which makes them unsuitable for low-rate codes. When R>0.8, the complexity of EMSD could be further reduced. HGRAND shares the same complexity with EMSD when R<0.7 and also has low complexity on high rates. Furthermore, at R=0.8, HGRAND reduces 33.3% complexity than the minimum complexity of EMSD and GRAND methods. This is because the accelerated GRAND outputs first (Case 3). For low-rate codes, setting α=1 for EMSD and HGRAND is better than setting α=0.5. EMSD and HGRAND have less complexity on R=0.35, 0.4, 0.65 for RM codes. Even ORBGRAND reduces the complexity compared to SGRAND, and HGRAND has much lower complexity than ORBGRAND, especially on low-rate codes. The conclusions are similar at $E_b/N_0$=6 dB (see plot 404). HGRAND achieves the minimum complexity compared other schemes on different rates. Due to use of the accelerated GRAND, at R=0.65, HGRAND reduces 57.6% complexity than the minimum complexity of EMSD and SGRAND.

The time complexity comparison of the schemes on fixed rates are shown on FIG. 4 in plots 406, 408, 410, and 412, respectively. For (64, 26) codes, HGRAND not only shares the same complexity with EMSD at low $Eb/N_0$, but also achieves a 20% complexity reduction compared to EMSD at $Eb/N_0$=7 dB. For (64, 42) and (64, 51) codes, SGRAND and ORBGRAND have higher complexity at low $Eb/N_0$, and achieve lower complexity than EMSD at high $Eb/N_0$. For (64, 57) codes, SGRAND and ORBGRAND achieve a lower complexity than EMSD for all Eb/Nos. HGRAND still obtains nearly the lowest time complexity on different rates at different Eb/NoS.

Figure 5:
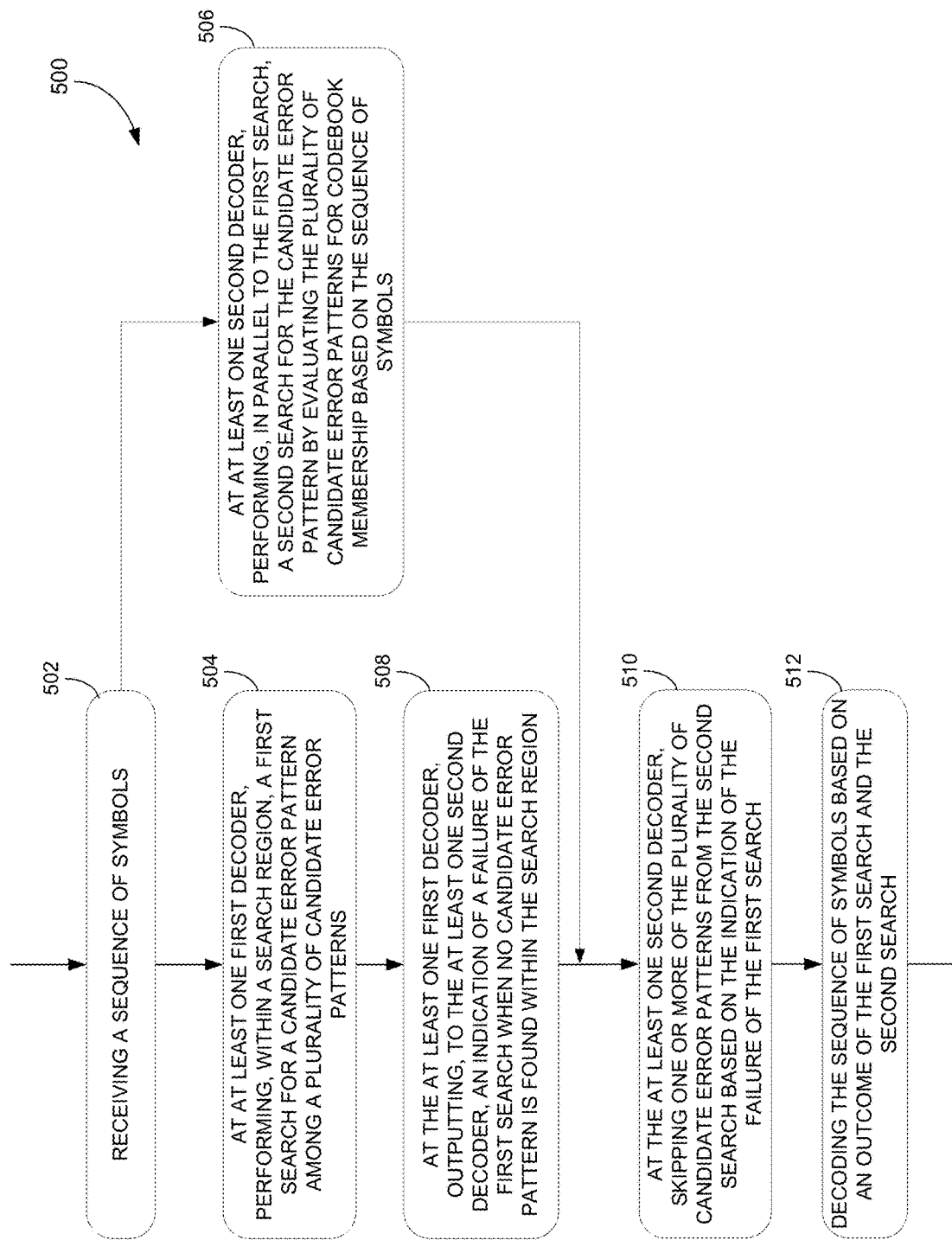
FIG. 5 is a flowchart of a method for decoding data, in accordance with one embodiment.

FIG. 5 is a flowchart 500 illustrating a method for decoding data, in accordance with one embodiment. The method 500 is illustratively performed by the decoding unit 14 of FIG. 1A, in the manner described herein above with reference to FIG. 1A and FIG. 1B. The method 500 comprises, at step 502, receiving a sequence of symbols (e.g., at the data receiver 10 of FIG. 1A). Step 504 comprises performing, at at least one first decoder (e.g., at the first decoder(s) 16 of FIG. 1A, which may comprise a SD decoder, as described herein above) and within a search region, a first search for a candidate error pattern among a plurality of candidate error patterns. The search region may be defined by a radius. The radius of the search region is progressively expanded until the candidate error pattern is found within the search region.

In the illustrated embodiment, step 506 is performed at at least one second decoder (e.g., to the second decoder(s) 18 of FIG. 1A, which may comprise a GRAND decoder, as described herein above) and comprises performing, in parallel to the first search, a second search for the candidate error pattern by evaluating the plurality candidate error patterns for codebook membership based on the sequence of symbols. In some embodiments, the candidate error patterns are evaluated sequentially. In other embodiments, the candidate error patterns are evaluated partly or fully in parallel.

Step 508 comprises, at the at least one first decoder, outputting, to the at least one second decoder, an indication of a failure of the first search when no candidate error pattern is found within the search region.

Step 510 comprises, at the at least one second decoder, skipping one or more of the plurality of candidate error patterns from the second search based on the indication of the failure of the first search, in the manner described herein above with reference to FIG. 1A and FIG. 1B. Step 512 then comprises decoding the sequence of symbols based on an outcome of the first search and the second search (e.g., based on the output of the first decoder(s) 16 and the second decoder(s) 18).

Figure 6:
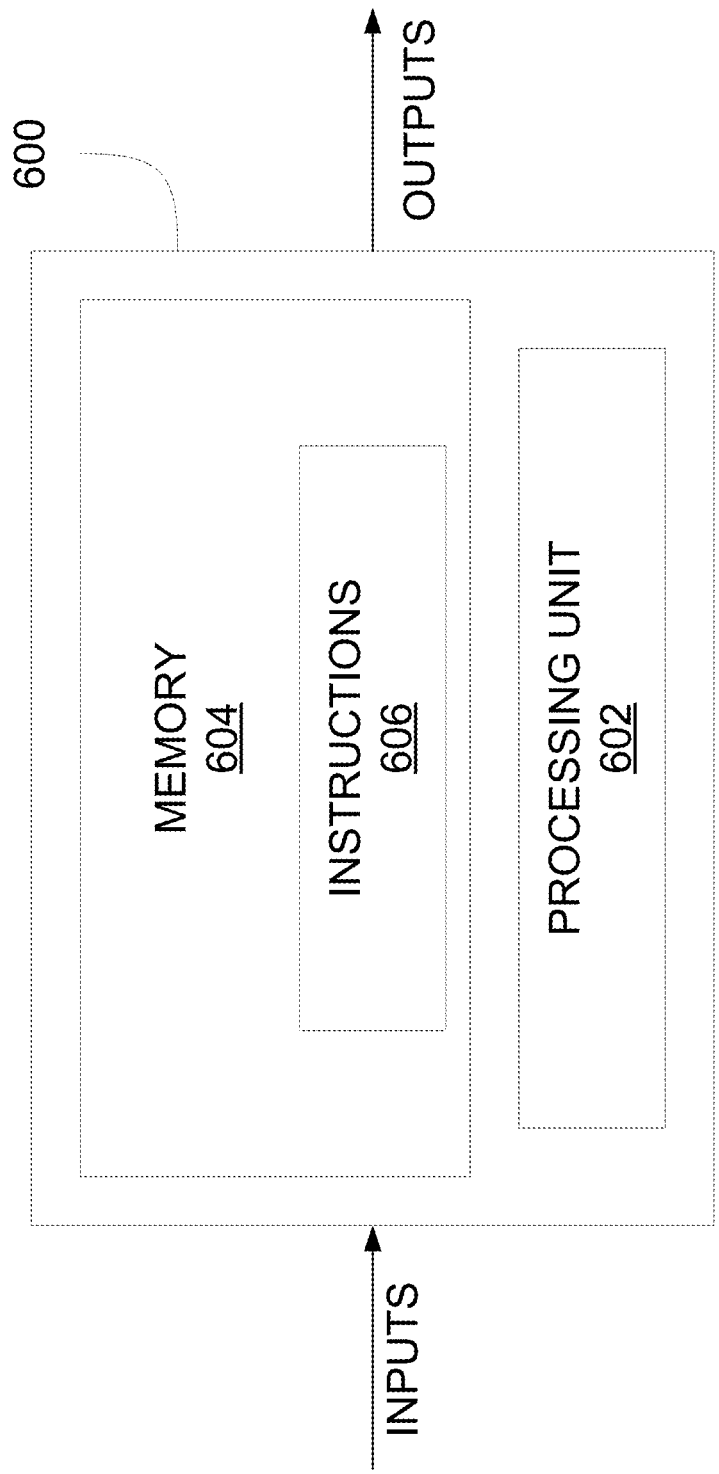
FIG. 6 is a schematic diagram of computing device, in accordance with one embodiment.

FIG. 6 is a schematic diagram of computing device 600, which may be used to implement the decoding unit 14 of FIG. 1A and/or the method 500 of FIG. 5. The computing device 600 comprises a processing unit 602 and a memory 604 which has stored therein computer-executable instructions 606. The processing unit 602 may comprise any suitable devices configured to implement the functionality of the method 500 such that instructions 606, when executed by the computing device 600 or other programmable apparatus, may cause the functions/acts/steps performed by method 500 as described herein to be executed. The processing unit 602 may comprise, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g. devices) suitable for retrievably storing machine-readable instructions 606 executable by the processing unit 602.

In one embodiment, the methods and systems described herein may allow to achieve a latency lower than the minimum latency of the individual component decoders (i.e. of the SD and GRAND decoders) while allowing for enhanced error-correction performance. In some embodiments, the error-correction performance of the proposed HGRAND decoding technique is no worse than the lower of the two individual algorithms, i.e. ML if SGRAND is used, and near-ML if ORBGRAND is used. Moreover, the proposed HGRAND decoding technique implements an accelerated GRAND and may decode with lower latency than either of the component SD or GRAND decoders working individually. In addition, the systems and methods described herein may be used to extend GRAND to low-rate polar and RM codes.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for decoding data, the method comprising:
at a data receiver comprising at least one first decoder and at least one second decoder configured to run in parallel with the first decoder:
receiving a sequence of symbols from a data sender over a noisy data channel;

at the at least one first decoder:
  performing, within a search region, a first search for a candidate error pattern among a plurality of candidate error patterns; and
  outputting, to the at least one second decoder, an indication of a failure of the first search when no candidate error pattern is found within the search region;
at the at least one second decoder:
  performing, in parallel with the first search, a second search for the candidate error pattern by evaluating the plurality of candidate error patterns for codebook membership based on the sequence of symbols, one or more of the plurality of candidate error patterns being skipped from the second search based on the indication of the failure of the first search; and
  decoding the sequence of symbols based on an outcome of the first search and the second search.

2. The method of claim 1, wherein the at least one first decoder implements a Sphere Decoding (SD) technique and the at least one second decoder implements a Guessing Random Additive Noise Decoding (GRAND) technique.

3. The method of claim 2, wherein the at least one first decoder implements one of multiple tree search SD (MSD), SD with fixed lower bound, list SD, stack SD, and cyclic redundancy check (CRC)-aided SD.

4. The method of claim 3, wherein the at least one first decoder implements an efficient multiple tree search SD (EMSD) decoding technique.

5. The method of claim 2, wherein the at least one second decoder implements one of soft GRAND (SGRAND), ordered reliability bits GRAND (ORBGRAND), ORBGRAND, GRAND with abandonment (GRANDAB), GRAND with symbol reliability information (SRGGRAND), GRAND Markov Order (GRAND-Mo), and List-GRAND.

6. The method of claim 2, wherein the search region is defined by a radius, further wherein performing the first search for the candidate error pattern comprises progressively expanding the radius of the search region until the candidate error pattern is found within the search region.

7. The method of claim 1, wherein receiving the sequence of symbols comprises receiving a code having a triangular generator matrix.

8. The method of claim 7, wherein receiving the sequence of symbols comprises receiving one of a polar code and a Read-Muller (RM) code.

9. The method of claim 1, wherein receiving the sequence of symbols comprises receiving a Bose-Chaudhuri-Hocquenghem (BCH) code.

10. A data receiver comprising:
  a receiving unit configured for receiving a sequence of symbols from a data sender over a noisy data channel;
  a decoding unit comprising at least one first decoder and at least one second decoder configured to run in parallel with the first decoder,
  the at least one first decoder configured for:
    performing, within a search region, a first search for a candidate error pattern among a plurality of candidate error patterns; and
    outputting, to at least one second decoder, an indication of a failure of the first search when no candidate error pattern is found within the search region; and
  the at least one second decoder configured for:
    performing, in parallel with the first search, a second search for the candidate error pattern by evaluating the plurality of candidate error patterns for codebook membership based on the sequence of symbols, one or more of the plurality of candidate error patterns being skipped from the second search based on the indication of the failure of the first search; and
  the decoding unit configured for decoding the sequence of symbols based on an outcome of the first search and the second search.

11. The data receiver of claim 10, wherein the at least one first decoder implements a Sphere Decoding (SD) technique and the at least one second decoder implements a Guessing Random Additive Noise Decoding (GRAND) technique.

12. The data receiver of claim 11, wherein the at least one first decoder implements one of multiple tree search SD (MSD), SD with fixed lower bound, list SD, stack SD, and cyclic redundancy check (CRC)-aided SD.

13. The data receiver of claim 12, wherein the at least one first decoder implements an efficient multiple tree search SD (EMSD) decoding technique.

14. The data receiver of claim 11, wherein the at least one second decoder implements one of soft GRAND (SGRAND), ordered reliability bits GRAND (ORBGRAND), ORBGRAND, GRAND with abandonment (GRANDAB), GRAND with symbol reliability information (SRGGRAND), GRAND Markov Order (GRAND-Mo), and List-GRAND.

15. The data receiver of claim 11, wherein the search region is defined by a radius, further wherein the at least one first decoder is configured for performing the first search for the candidate error pattern comprising progressively expanding the radius of the search region until the candidate error pattern is found within the search region.

16. The data receiver of claim 10, wherein the receiving unit is configured for receiving the sequence of symbols comprising receiving a code having a triangular generator matrix.

17. The data receiver of claim 16, wherein the receiving unit is configured for receiving the sequence of symbols comprising receiving one of a polar code and a Read-Muller (RM) code.

18. The data receiver of claim 10, wherein the receiving unit is configured for receiving the sequence of symbols comprising receiving a Bose-Chaudhuri-Hocquenghem (BCH) code.

19. The data receiver of claim 10, further comprising an output unit configured for receiving a decoded sequence of symbols from the decoding unit and for transmitting the decoded sequence of symbols to an external device.

20. A non-transitory computer readable medium having stored thereon program code executable by at least one processor for:
  receiving a sequence of symbols over a noisy data channel;
  performing, within a search region, a first search for a candidate error pattern among a plurality of candidate error patterns;
  outputting an indication of a failure of the first search when no candidate error pattern is found within the search region;
  performing, in parallel with the first search, a second search for the candidate error pattern by evaluating the plurality of candidate error patterns for codebook membership based on the sequence of symbols, one or more of the plurality of candidate error patterns being skipped from the second search based on the indication of the failure of the first search; and decoding the sequence of symbols based on an outcome of the first search and the second search.

* * * * *